United States Patent [19]
Edstrom, Sr. et al.

[11] Patent Number: 5,823,144
[45] Date of Patent: Oct. 20, 1998

[54] CAGE AND RACK SYSTEM INCORPORATING AUTOMATIC WATER DOCKING SYSTEM, LATCH MECHANISM, AND QUICK-CONNECT COUPLING

[75] Inventors: William E. Edstrom, Sr., Waterford; Glen W. Trickle, Elm Grove; Peter S. Planton, Muskego, all of Wis.

[73] Assignee: Edstrom Industries, Inc., Waterford, Wis.

[21] Appl. No.: 601,528

[22] Filed: Feb. 14, 1996

[51] Int. Cl.$^6$ .................................................. A01K 1/00
[52] U.S. Cl. .......................................................... 119/475
[58] Field of Search .................................. 119/475, 464, 119/456, 465, 454, 449

[56] References Cited

U.S. PATENT DOCUMENTS

| | | | |
|---|---|---|---|
| 3,567,175 | 3/1971 | Sciuto, Jr. ............................. | 251/149.6 |
| 3,809,122 | 5/1974 | Berg ..................................... | 137/614.06 |
| 4,343,261 | 8/1982 | Thomas ................................. | 119/15 |
| 4,402,280 | 9/1983 | Thomas ................................. | 119/15 |
| 4,485,845 | 12/1984 | Brady .................................. | 137/614.04 |
| 5,042,429 | 8/1991 | Deitrich et al. ........................ | 119/15 |
| 5,044,316 | 9/1991 | Thomas ................................. | 119/15 |
| 5,048,459 | 9/1991 | Niki et al. ............................ | 119/17 |
| 5,074,524 | 12/1991 | Wade ................................... | 251/149.6 |
| 5,148,766 | 9/1992 | Coiro, Sr. et al. ..................... | 119/17 |
| 5,167,398 | 12/1992 | Wade et al. ........................... | 251/149.6 |
| 5,253,842 | 10/1993 | Huebscher et al. ..................... | 251/149.6 |
| 5,337,696 | 8/1994 | Edstrom et al. ........................ | 119/18 |
| 5,385,118 | 1/1995 | Coiro, Sr. et al. ..................... | 119/18 |

Primary Examiner—Mickey Yu
Assistant Examiner—John M. Black
Attorney, Agent, or Firm—Nilles & Nilles, S.C.

[57] ABSTRACT

A cage and rack system includes at least one cage, a shelf, and a water docking system that holds the cage in the position on the shelf in which a cage-mounted animal watering valve is coupled to a water manifold so as to assure the supply of water to the watering valve without leakage. The water docking system includes a latch mechanism and a coupling. The latch mechanism includes a latch catch which is movable 1) from an unlatched position in which it is disengaged from the cage and permits removal of the cage from the rack 2) to a latched position holding the cage in its docked position. The coupling may comprise either a friction-fit quick-connect or a locking quick-connect coupling and includes a male fitting and a female fitting. The male fitting is designed to prevent leakage by sequentially engaging two internal seals of the female fitting so as to first seal against the female fitting and then open an internal valve element of the female fitting.

8 Claims, 9 Drawing Sheets

CAGE AND RACK SYSTEM INCORPORATING AUTOMATIC WATER DOCKING SYSTEM, LATCH MECHANISM, AND QUICK-CONNECT COUPLING

BACKGROUND OF THE INVENTION

1. Field of the Invention

The invention relates to automatic water docking systems for cage and rack systems and, more particularly, to a water docking system having a latch mechanism and/or a quick-connect coupling which facilitates docking and which inhibits or prevents rack flooding.

2. Discussion of the Related Art

It is desirable to supply drinking water to laboratory animals or the like reliably and automatically upon demand. Such water is typically supplied to animals housed in cages docked to a water manifold of a rack system.

One such cage and rack system is disclosed in U.S. Pat. No. 5,042,429 to Deitrich et al. (the Deitrich patent) The system disclosed in the Deitrich patent houses a plurality of laboratory animals in rows of cages supported on shelves of a rack. The cages are supplied with water by a common water manifold and with air by a common air manifold.

Watering systems of the type disclosed in the Deitrich patent must accommodate frequent removal of the individual cages from the rack, e.g., for testing animals housed therein or for cage cleaning. Such systems usually also seek to minimize cross-contamination of the animals housed in the various cages. Deitrich attempts to accommodate these requirements by connecting each of the individual cages of its system to the water manifold by a quick-connect coupling. This coupling includes, in the case of each cage, a watering valve fixed to the cage, a male fitting attached to the watering valve and extending inwardly from the cage, and a female fitting extending outwardly from the water manifold. The male fitting engages the female fitting with a friction fit when the cage is properly positioned on the rack. According to the Deitrich patent disclosure, the friction-fit type quick-connect coupling facilitates removal and replacement of the cages, and the internal watering valve prevents or at least inhibits cross-contamination between cages.

The friction-fit quick-connect coupling employed by the Deitrich patent, while facilitating removal and replacement of a cage, exhibits the disadvantage of not "locking" the cage in its docked position so that, if the cage is bumped or improperly positioned, the coupling may leak and/or fail to deliver water to the animal housed in the cage. While failing to deliver water to the animal is problematic because it could result in the dehydration or even death of the animal, leakage is an even greater problem because it could result in the flooding of several or even all of the cages on a rack and in the sickness or even death of all of the animals housed in those cages. The need therefore has arisen to provide a water docking system which, while facilitating removal and replacement of cages and preventing or at least inhibiting cross-contamination between cages, also reliably delivers drinking water without leakage to the animals housed in the cages.

One at least partially successful attempt to address this need is disclosed in U.S. Pat. No. 5,337,696 to Edstrom et al. (the Edstrom patent). The cage and rack system disclosed in the Edstrom patent inhibits unintended cage undocking by using a locking quick-connect coupling to connect the watering valve to the water manifold. The locking quick-connect coupling disclosed in the Edstrom patent has a collar on the female fitting which locks onto the male fitting when a plug of the male fitting is inserted into the female fitting and which must be manually retracted to permit subsequent uncoupling. Uncoupling is facilitated by a decoupler which may take the form of a lever mechanism or a cable mechanism leading from the front of the cage to the collar on the female fitting.

The docking system of the cage and rack system disclosed in the Edstrom patent inhibits leaks and assures the supply of water to animals once the male fitting of the quick-connect coupling is positively locked to the female fitting. However, certain characteristics of this system may be considered disadvantageous to some. For instance, it is difficult for the casual inspector to determine whether or not the male fitting is in fact locked to the female fitting unless he or she physically grabs the cage and pulls it towards him or her with some force. Moreover, both the locking quick-connect coupling and the associated decoupler are relatively expensive to manufacture. The decoupler also inhibits to some extent cage removal because a person who is removing the cage must first actuate a lever or cable mechanism to release the locking coupling, then remove the cage from the shelf.

In short, the system disclosed in the Edstrom patent represents a trade-off when compared to existing water docking systems employing friction-fit couplings. It provides a much more reliable and less leak-prone connection of the watering valve to the water manifold and effectively locks the cage in its docked position. However, these benefits come at the cost of increased complexity and reduced ability to remove the cage from the rack.

As discussed above, a problem associated with many prior art water docking systems, and particularly those using friction-fit couplings, is that the couplings used in such systems tend to leak unless the cage is maintained in a fully-docked position on the rack in which the plug of the male fitting is fully inserted into the bore of the female fitting. This leakage results from the fact that the plug of the typical male fitting seals against the female fitting only after it opens the internal valve of the female fitting. Accordingly, water may flow around the male fitting and leak out of the coupling for a brief time as the male fitting is being inserted into the female fitting. If the male fitting is left in this partially-inserted position, water flows past the male fitting and leaks out of the coupling on a continuous basis, flooding the cage and rack system.

Prior art attempts to solve the problem of coupling leaks focused on locking the coupling and/or cage in a position in which the male fitting was sealed against the female fitting. Leakage could still occur if these latches or other safety features were improperly used, failed, or were circumvented. Leakage could also occur if the internal seal of the coupling failed.

OBJECTS AND SUMMARY OF THE INVENTION

It is therefore a primary object of the invention to provide a water docking system for a cage and rack system which includes a cage latch mechanism and a water coupling which interact to prevent coupling leakage and consequent cage flooding and to help ensure the continuous supply of drinking water to animals housed in the cage.

A secondary object of the invention is to provide a cage and rack system including a water docking system which exhibits the characteristics described above and which facilitates cage docking and undocking to and from the water manifold.

Another secondary object of the invention is to provide a cage and rack system including a water docking system which exhibits or more of the characteristics described above and which is relatively simple to fabricate, install, and use.

In accordance with a first aspect of the invention, these objects are achieved by providing a cage and rack system having a water docking system including a coupling and a latch mechanism. The coupling includes a female fitting which is connected to the water manifold and a male fitting which is supported on the rear wall of the cage, and an animal watering valve being connected to the male fitting and extending into the cage. The latch mechanism is mounted on the rack. The latch mechanism includes a latch catch which is movable from 1) a latched position in which it positively engages the front wall of the cage and holds the cage in a position in which the male fitting is sealingly inserted into the female fitting so as to permit water to flow therethrough, to 2) an unlatched position in which it is disengaged from the cage and permits removal of the cage from the rack shelf.

Other objects, features, and advantages of the invention will become more apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

For holding the cage in a position on the shelf in which a cage-mounted animal watering valve is coupled to a water manifold so as to assure the supply of water to the watering valve without leakage. The cage and rack system further includes a water docking system that comprises, inter alia, a latch mechanism and a coupling. The latch mechanism includes a latch catch which is movable 1) from an unlatched position in which it is disengaged from the cage and permits removal of the cage from the rack 2) to a latched position holding the cage in its docked position. The coupling may comprise either a friction-fit quick-connect or a locking quick-connect coupling and includes a male fitting and a female fitting. The male fitting is designed to prevent leakage by sequentially engaging two internal seals of the female fitting so as to first seal against the female fitting and then open an internal valve element of the female fitting.

2. System Overview

Referring now to the drawings and to FIGS. 1–4 in particular, a portion of a cage and rack system 20 is illustrated. The cage and rack system 20 includes a rack 22, an air manifold 24, a water manifold 26, and a plurality of cages 28. As is conventional, the rack 22 includes a support frame (not shown) and a plurality of shelves 30 which are mounted on the support frame and on which are supported the cages 28. The shelves 30 are arranged in vertically spaced rows, and two shelves 30 are preferably, but not necessarily, provided in each row in a back-to-back relationship.

The air supply manifold 24 and associated air supply tubes, supply valves, and exhaust valves (not shown) are conventional and, accordingly, will not be detailed. The water manifold 26 and the associated supply and drain valves (not shown) are also conventional and likewise will not be detailed. A plurality of nipples 32 are aligned with the air supply tubes and extend outwardly from the water manifold 26 towards the cages 28 for receiving the couplings 150 as detailed below.

The cages 28 are also conventional. Each cage 28 includes front and rear end walls 34, 36 respectively, and a pair of opposed sidewalls 38, 40 connecting the walls 34 and 36 to one another. Each cage 28 additionally includes an enclosed base 42 capped with a filter bonnet 44. The filter bonnet may have an internal filter for preventing the transfer of air from one cage to another. The rear wall 36 of the base 42 of each cage 28 has an opening formed therein for accommodating a grommet 46. The grommet 46 has apertures formed therethrough for accommodating 1) a water coupling 150 of the docking system detailed below and 2) the air tube (not shown). The illustrated cage 28 also includes vertically-extending ribs 48 located at the corners thereof to facilitate stacking. Ribs 48, if present, also serve as a convenient abutment for the latch mechanism 100 detailed below. However, it should be emphasized that the invention is equally applicable to cages lacking such ribs.

Each cage 28 is aligned and properly positioned with respect to the associated air supply tube and nipple 32 by a pair of longitudinally-spaced cage guide assemblies 50. The cage guide assemblies 50 associated with each shelf 30 are suspended from the bottom of a vertically adjacent shelf 30 by mounting brackets 56 and are mounted back-to-back at all locations except the ends of the rack. Each cage guide assembly 50 is substantially U-shaped and includes a pair of arms 52, 54 which generally surround the portion of the cage 28 at which the bonnet 44 overlies the base 42.

Figure 9:
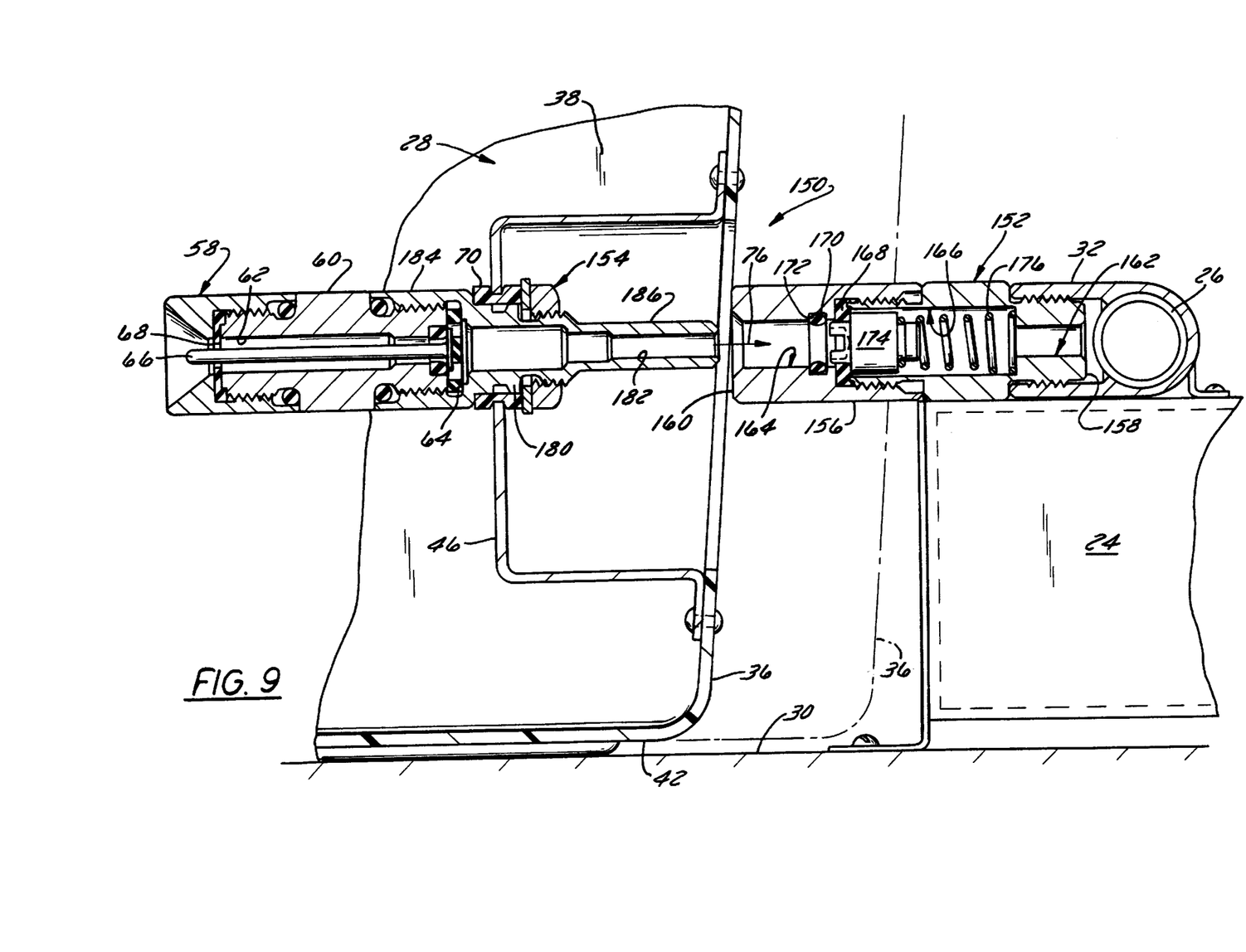
FIG. 9 is a sectional side elevation view of a first coupling usable the water-docking system of FIGS. 1–4 and of the corresponding portions of the cage and rack system and illustrating the male fitting of the coupling in a position in which it would be located just prior to insertion into the female fitting.

A male fitting 154 of the quick-connect coupling 150 receives an animal watering valve 58 on its outer end. A holder 70 is mounted in the grommet 46 and receives the male fitting 154 such that the watering valve 58 extends into the cage 28 and a plug 186 of the male fitting 154 extends inwardly or rearwardly from the cage 28. The animal watering valve 58 preferably comprises an animal-actuated valve opened by the tongue or snout of an animal housed in the cage. Towards this end, and referring to FIG. 9, the watering valve 58 includes a generally cylindrical body 60 having a bore 62 formed axially therethrough. Disposed within the bore 62 are a diaphragm 64 forming a valve element, an animal-actuated valve stem 66, and an elastomeric shield 68. Valves of this type are disclosed, e.g., in U.S. Pat. No. 5,337,696 and U.S. patent application Ser. No. 08/294,738, (now U.S. Pat. No. 5,501,177) both of which are assigned to the assignee of the present application and are hereby incorporated by reference in their entirety.

A separate water docking system is associated with each cage 28. Each water docking system includes a latch mechanism 100 and a coupling 150. The latch mechanism 100 and coupling 150 of each water docking system interact to selectively latch the associated cage 28 in a docked position in which water is supplied to the animal watering valve 58 from the water manifold 26 without leakage. The latch mechanism 100 and coupling 150 will now be described in sequence.

3. Latch Mechanism

The latch mechanism 100 includes a latch catch 102 which is movable 1) from an unlatched position in which it is disengaged from the cage 28 and permits removal of the cage from the shelf 30 2) to a latched position in which it positively engages the front wall 34 of the cage 28 and holds the cage 28 in a docked position in which the male fitting 154 of the coupling 150 is sealingly inserted in the female fitting 152 so as to permit water to flow therethrough. Preferably, the latch mechanism 100 is also capable of providing a visual indication of an unlatched condition. Referring now to the drawings and to FIGS. 1–7 in particular, the preferred latch mechanism 100 includes a stationary support plate 104, a pivot arm 106, a latch catch 102, a spring 108, and an indicator assembly 110.

The stationary support plate 104 is fixably mounted on the shelf 30 adjacent the cage 28. It is conceivable that the plate 104 could extend above or beneath the cage 28. However, plate 104 is preferably configured to extend generally in parallel with the sidewalls 38, 40 of the cage and, even more preferably, is located adjacent the sidewall 40. In the illustrated embodiment, the support plate 104 comprises a notched rectangular plate extending in parallel with and located directly beneath the lower leg 52 of the cage guide assembly 50. The support plate 104 is suspended from the lower leg 52 by an L-bracket 112 and is connected to the L-bracket 112 by bolts 114 or the like. The L-bracket 112 has a lower leg 116 which receives the support plate 104 and an upper leg 118 which is bolted or otherwise affixed to the lower leg 52 of channel guide 50. A rectangular tab 120 extends downwardly from a central portion of the upper leg 118 so as to serve as a stop for the pivot arm 106. An additional flange 122 extends rearwardly from the outer end of the support plate 104, i.e., away from the cage 28, so as to serve as a shield of the indicator assembly 110 as detailed below.

The pivot arm 106 is designed to be swingable about a vertical axis 128 1) from a first position in which the pivot arm 106 extends at least substantially in parallel with the support plate 104 and in which an outer end of the pivot arm 106 is located adjacent the support plate 104 2) to a second position in which the outer end of the pivot arm 106 is spaced transversely from the support plate 104. To this end, the illustrated pivot arm 106 comprises a generally rectangular plate 124 having inner and outer ends. The inner end of plate 124 is pivotally attached to the support plate 104 by a hinge 126. The outer end of the pivot plate 124 is bent rearwardly away from the cage 28 so as to define an indicator mount 130 at its upper end. Finally, a tab 132 extends upwardly from a central portion of the pivot plate 124 for mating engagement with the stop 120 of the support plate 104.

Figure 3:
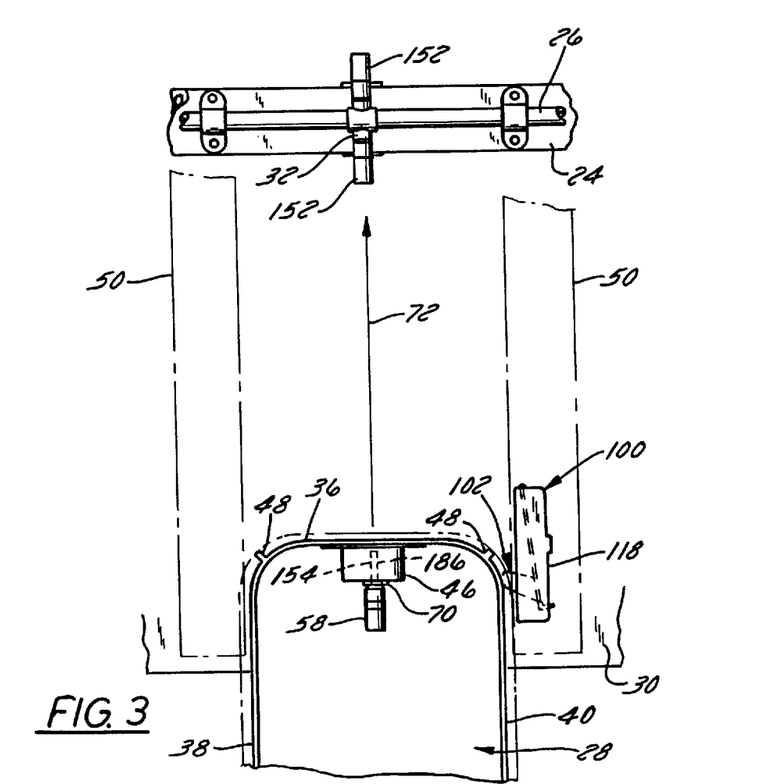
FIG. 3 is a top plan view illustrating the manner in which a cage of the cage and rack system of FIGS. 1 and 2 is inserted onto a shelf of the rack thereof.
Figure 4:
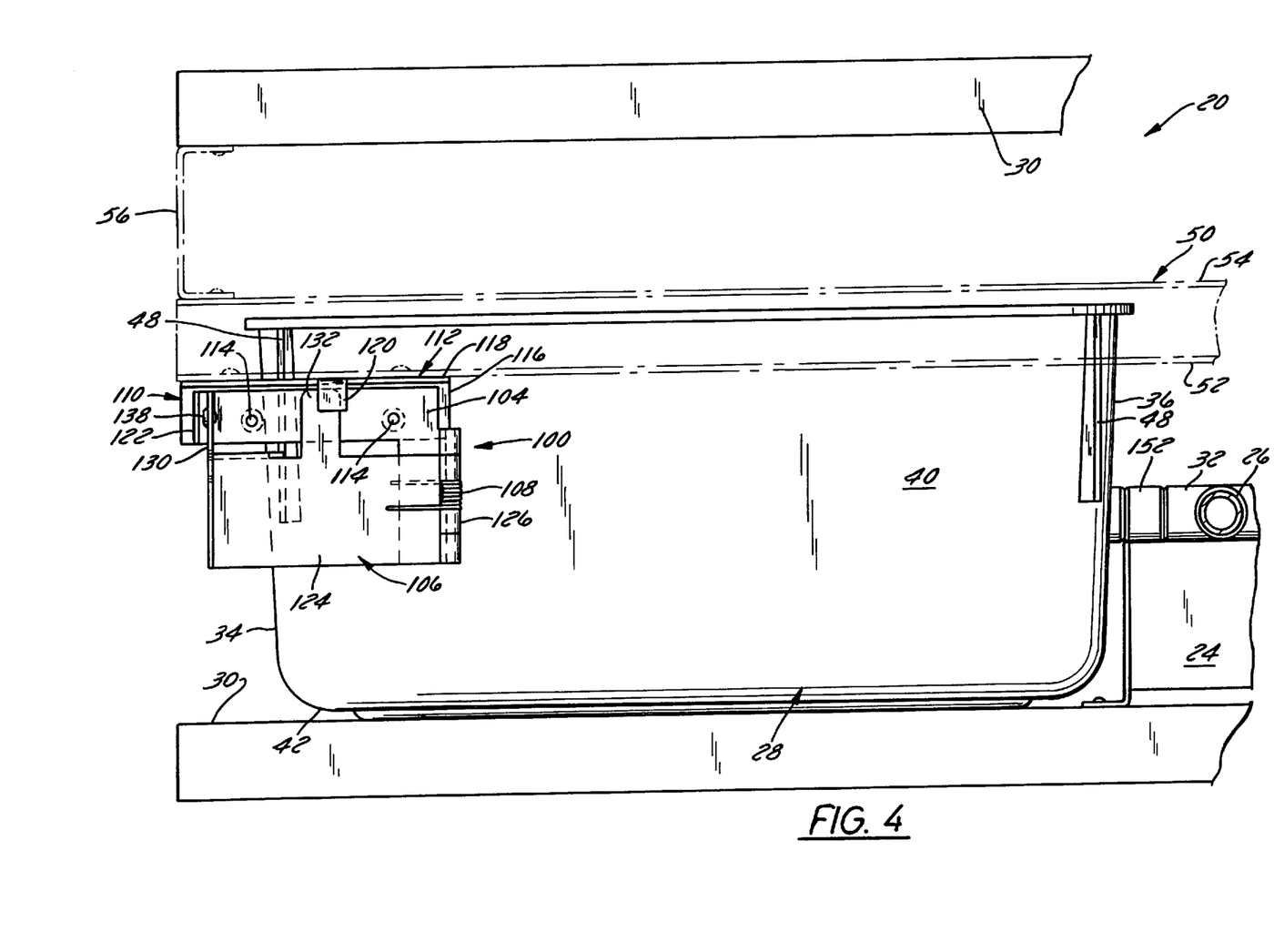
FIG. 4 is a side elevation view of a cage of the cage and rack system of FIGS. 1–3, illustrating the cage docked to the water manifold.
Figure 5:
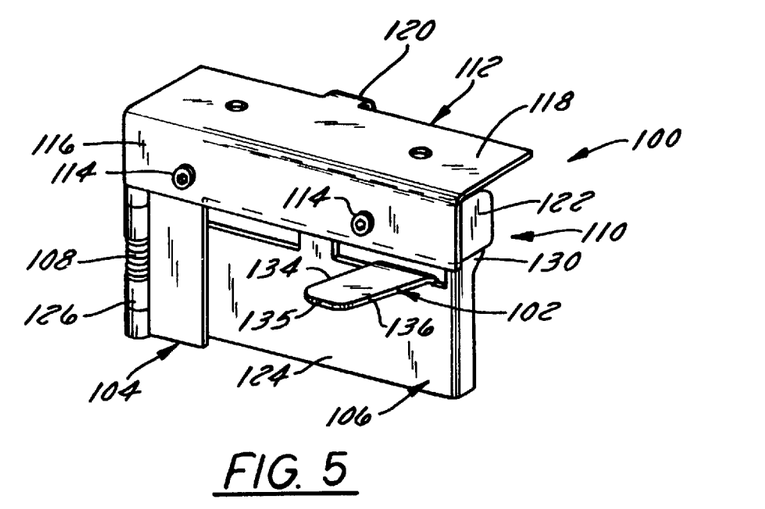
FIG. 5 is a perspective view of the latch mechanism usable in the water docking system of FIGS. 1–4, viewed from in front of the latch mechanism and illustrating the latch mechanism in a latched position.
Figure 6:
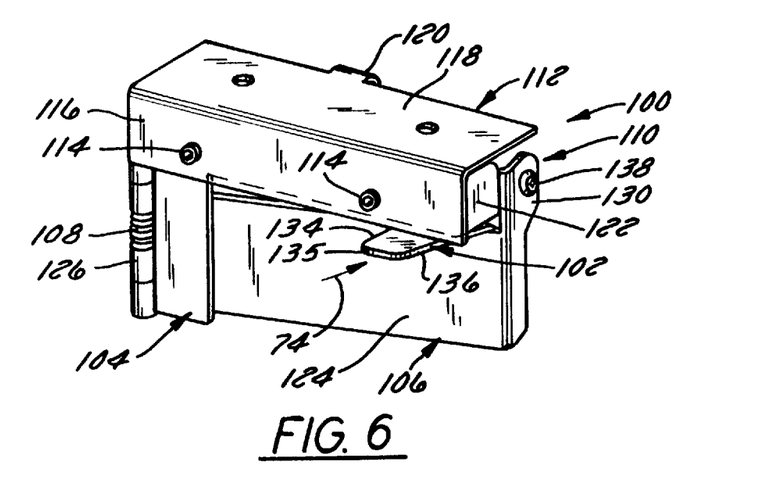
FIG. 6 is a perspective view of the latch mechanism of FIG. 5, viewed from the front side of the latch mechanism and illustrating the latch mechanism in an unlatched position.
Figure 7:
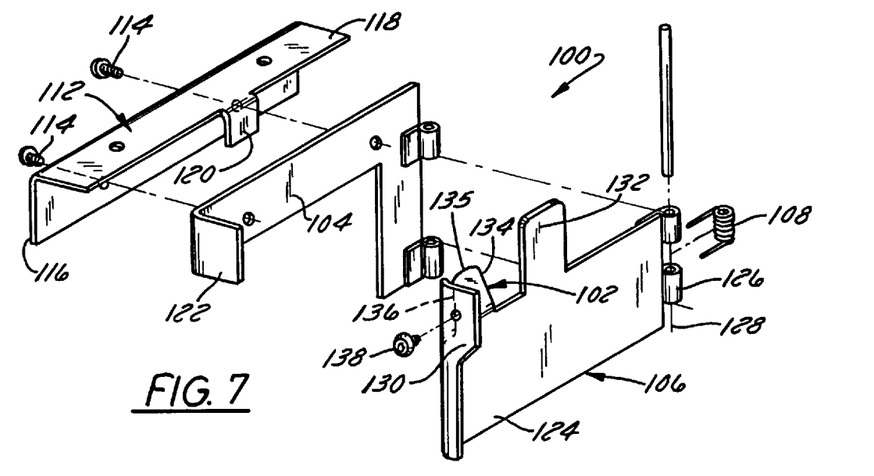
FIG. 7 is an exploded perspective view of the latch mechanism of FIGS. 5 and 6.

The latch catch 102, preferably formed from the same plate 124 as the pivot arm 106, extends forwardly from the upper-edge of the outer end of the pivot arm 106 so as to engage the front wall 34 of the cage 28 to hold the cage 28 in its docked position when the pivot arm 106 is in its first position and so as to be disengaged from the cage 28 when the pivot arm 106 is in its second position. "Disengaged" as used herein does not mean that the latch catch 102 cannot touch the cage 28. Rather, "disengaged" means that the latch catch 102 permits sliding movement of the catch 102 as seen in FIG. 3 when in its unlatched position.

Figure 8A:
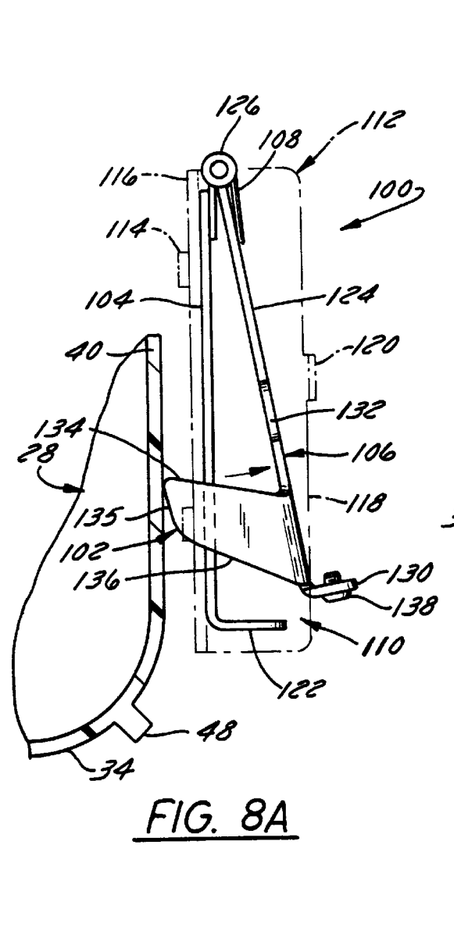
FIGS. 8a–8c are partially cut-away top plan views illustrating the latch mechanism of FIGS. 5–7 in various operational positions.
Figure 8B:
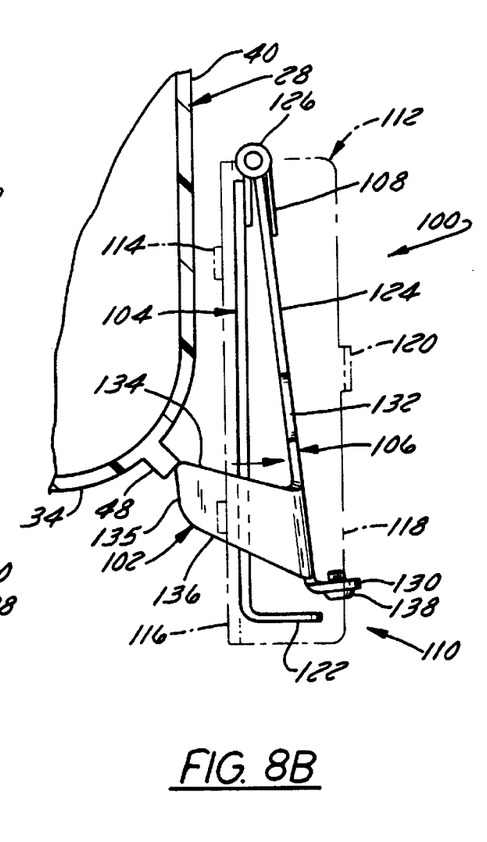
Figure 8C:
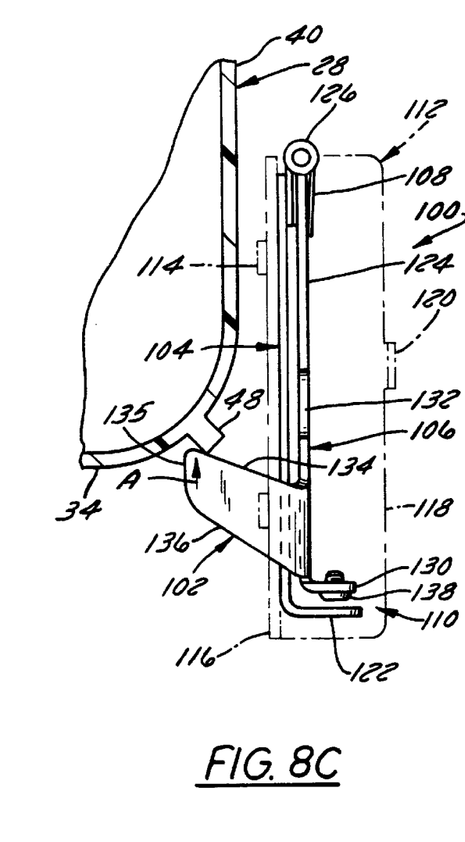

In the illustrated embodiment, the latch catch 102 is generally rectangular in shape so as to present inner and outer edges 134 and 136 joined by a front edge or tip 135. Both the inner edge 134 and the outer edge 136 are inclined forwardly and rearwardly with respect to the plane of the pivot arm 106. Preferably, the inner edge 134 of the latch catch 102 is angled such that, when the pivot arm 106 swings from its first or latched position to its second or unlatched position, the latch catch 102 does not apply significant additional forces in the direction of vector A in FIG. 8c and therefore does not significantly inhibit pivot arm swinging. Accordingly, the resistance to latch catch motion is only sliding friction of the contact point between the cage 28 and the latch catch 102. The angle on the outer edge 136 of the latch catch 102 causes the latch catch 102 to swing away from the cage 28 when the cage 28 is inserted onto the shelf 30 as illustrated in FIGS. 3, 8a and 8b, thereby to minimize interference with the sliding motion of the cage 28.

As mentioned above, an indicator assembly 110 is preferably included in the latch mechanism 100 to provide an easily visually discernable indication that the cage 28 is not properly docked with the water manifold 26. Providing such an indication is important because, if the cage 28 is not properly docked, no water will be supplied to the cage 28, and the animals housed therein may become dehydrated or even die. A variety of mechanical or electrical indicator assemblies may be suitable for this purpose. In the illustrated and preferred embodiment, the indicator assembly includes the shield 122 as described above and a simple mechanical flag-type indicator which is provided in the form of an indicator button 138. The indicator button 138, preferably colored red for maximum visual observability, is mounted on the outer flange or indicator mount 130 of the pivot arm 106. When the pivot arm 106 is in its first or latched position, best seen in FIGS. 5, 8c and the right half of FIG. 2, indicator button 138 is hidden from view by the outer flange or shield 122 of the support arm 104. When, on the other hand, the cage 28 is not properly docked as illustrated in the right half of FIG. 2 and in FIGS. 8a and 8b, the pivot arm 106 will be forced by the cage 28 to pivot in the direction of arrow 74 in FIG. 6 away from the support plate 104 such that the indicator button 138 is pivoted away from the shield 122 and is readily visible to even a casual observer.

4. Construction of Water Coupling

As discussed above, one problem associated with many water couplings is that, if the male fitting of the coupling is not fully inserted into the female fitting, the coupling could leak, potentially flooding the entire rack and causing discomfort, illness, or even death to many or all of the animals housed in the cages on that rack. The inventive coupling eliminates or at least drastically inhibits the occurrences of such flooding by preventing the internal valve of the female fitting from opening until after the male fitting of the coupling is sealed to the female fitting. Preferably, the coupling 150 also provides redundancy in seals such that, even if one of the seals in the coupling fails, seal integrity will be maintained by a second seal. Referring to the drawings and to FIGS. 9 and 10a–10d in particular, a preferred friction-fit coupling 150 meeting these criteria is illustrated and includes a female fitting 152 and a male fitting 154.

The female fitting 152 includes a generally cylindrical two-part body 156 having inlet and outlet ends 158 and 160 and being threadedly attached to the nipple 32 at its inner or inlet end 158. The body 156 has a bore 162 formed therein which preferably extends axially through the body 156 from the inlet end 158 to the outlet end 160. The bore 162 is stepped so as to have an outer portion 164 having a first diameter and an inner portion 166 having a second diameter which is larger than the first diameter. A first annular seal 168 is located in the inner portion 174 and is mounted on a shoulder formed by the step in the bore 162. A second annular seal or O-ring 170 is mounted in a groove 172 formed in the outer portion 164 of bore 162. A valve core 174 is located in the inner portion 166 of bore 162 and is movable axially, against the force of a spring 176, from a first position, illustrated in FIGS. 9, 10a, and 10b, in which it is sealingly seated on the first seal 168, to and beyond a second position, illustrated in FIG. 10c, in which it is spaced from the first seal 168 so as to permit water to flow therepast.

Figure 10A:
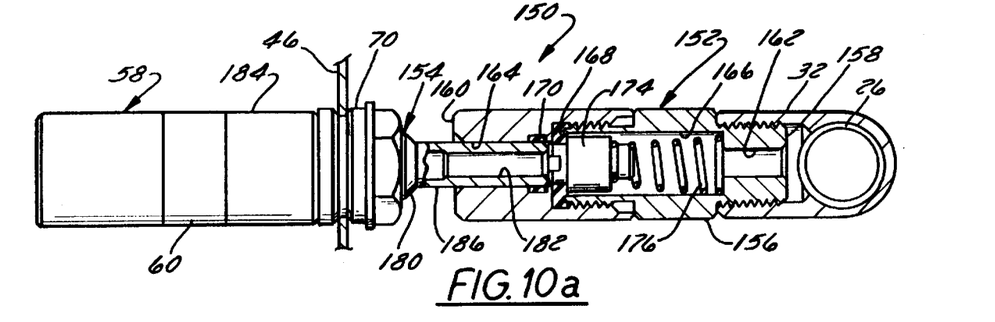
FIGS. 10a–10d are partial sectional side elevation views of the coupling of FIG. 9 and of the corresponding portions of the cage and rack system and illustrating the sequence of the coupling of the male fitting to the female fitting.
Figure 10B:
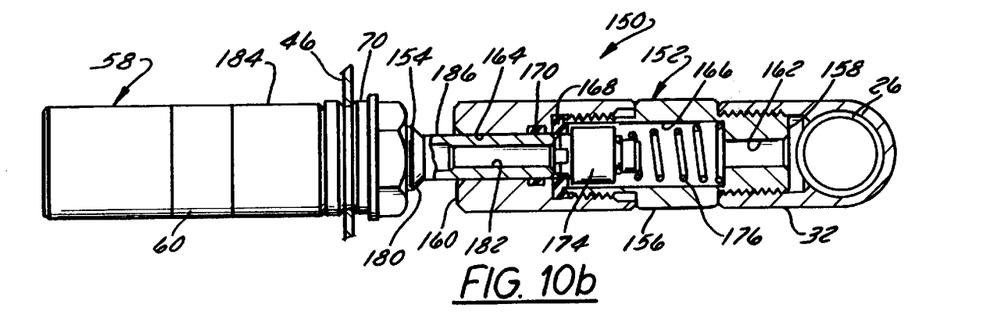
Figure 10C:
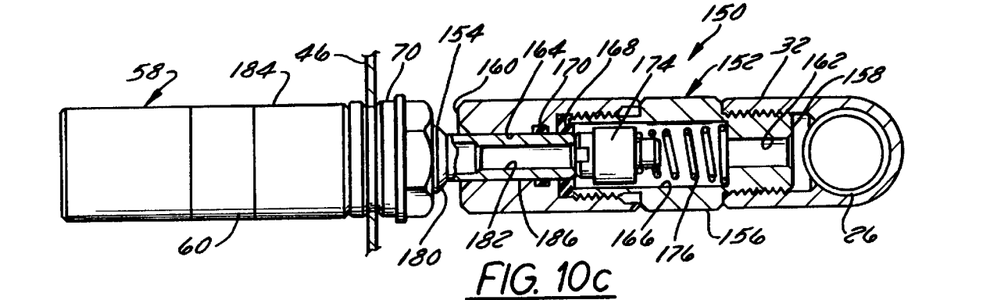
Figure 10D:
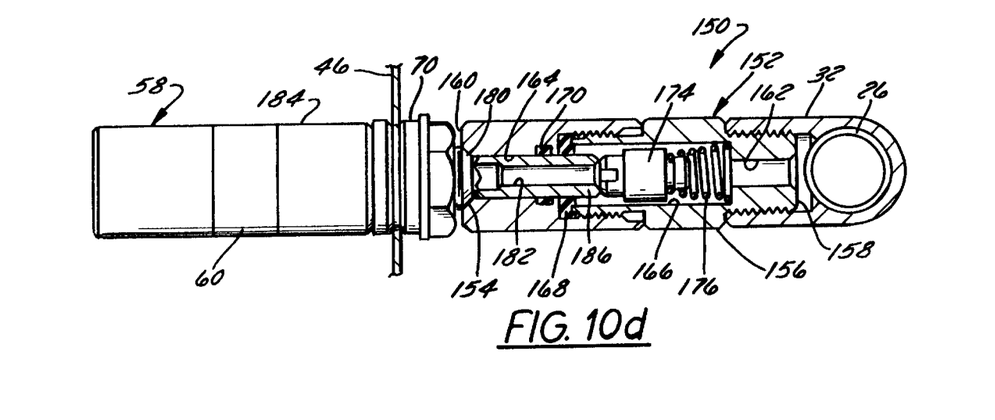

The male fitting 154 comprises a generally cylindrical body 180 having a bore 182 formed axially therethrough. An outer portion 184 of the body 180 is threadedly connected to the watering valve 58 and is bolted onto the holder 70. An inner end portion of the body 180 forms a generally cylindrical plug 186 which extends inwardly from the outer portion and which is dimensioned to be slidably received in the outer portion 164 of the bore 162 in the female fitting 152 with a slight clearance therebetween. The plug 186, the first and second seals 168 and 170, and the valve core 174 are so dimensioned and configured that, when the plug 186 is inserted axially into the bore 162 in the female fitting 152 from the outer or outlet end thereof, 1) the outer radial periphery of the plug 186 slidingly seals against the second seal 170 as illustrated in FIG. 10a, 2) the plug 186 then lifts the valve core 174 off the first seal 168 as illustrated in FIG. 10b, thereby permitting water to flow past the valve core 174, through the male fitting 154, and to the watering valve 58, and 3) the outer radial periphery of the plug 186 then slidingly seals against the first seal 168 as illustrated in FIG. 10c. Without the second seal 170, the coupling 150 could leak when in the male fitting 154 is position illustrated in FIG. 10b because water could flow past the outer radial periphery of the valve core 174 and out of the female fitting 152 of the coupling 150. The second seal 170 prevents this leakage and consequent possible flooding. FIG. 10d illustrates that the plug 186, valve core 174, and bore in the female fitting 152 are dimensioned to permit some over-travel of the plug 186 into the bore 162. As will be detailed below, this over-travel facilitates operation of the latch mechanism 100.

5. Operation of Docking System

The operation of the inventive docking system, although believed to be apparent from the preceding discussion, will be briefly discussed in order to highlight the advantages of the present invention.

Figure 1:
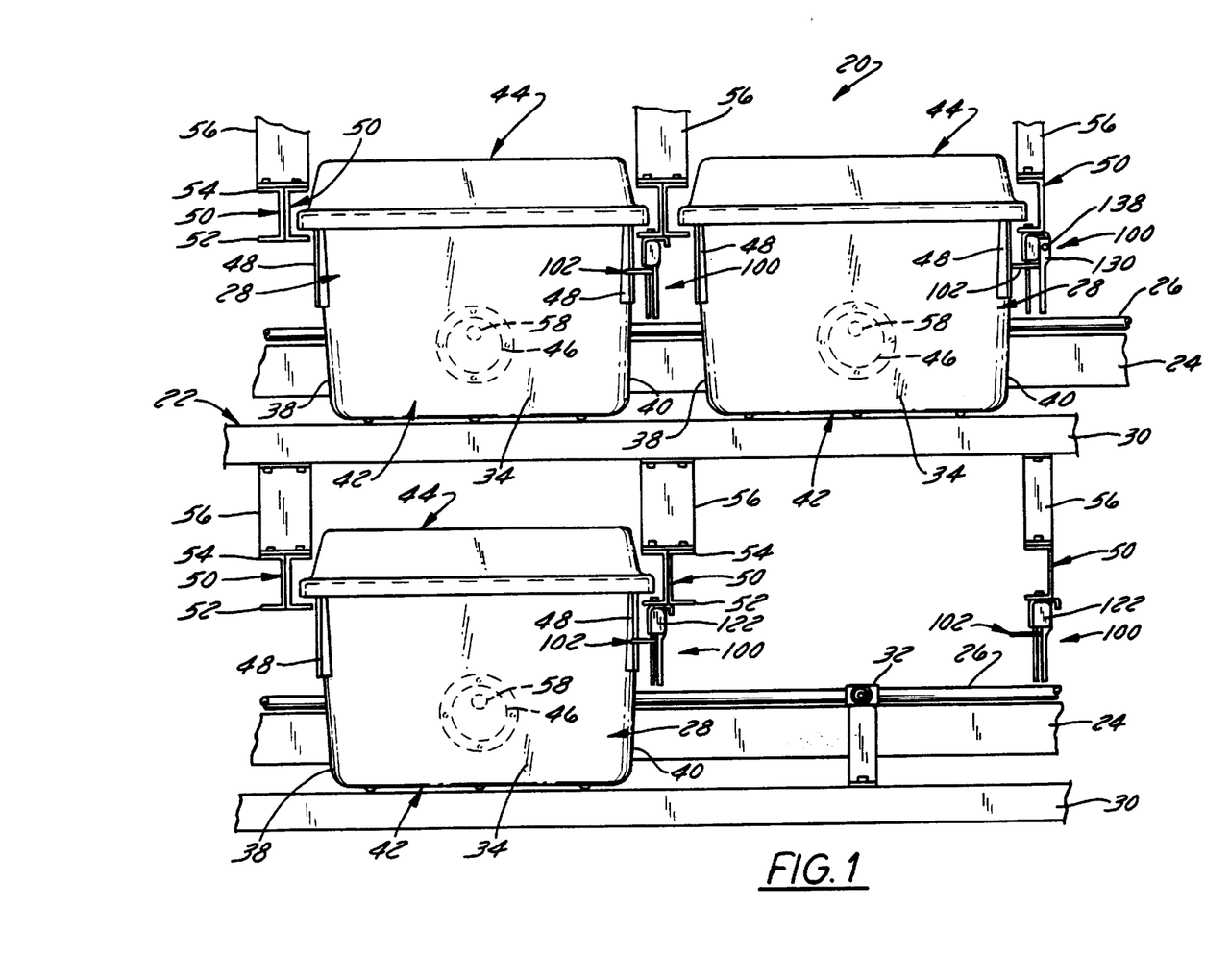
FIG. 1 is front elevation view of a cage and rack system employing a water docking system constructed in accordance with a preferred embodiment of the present invention.
Figure 2:
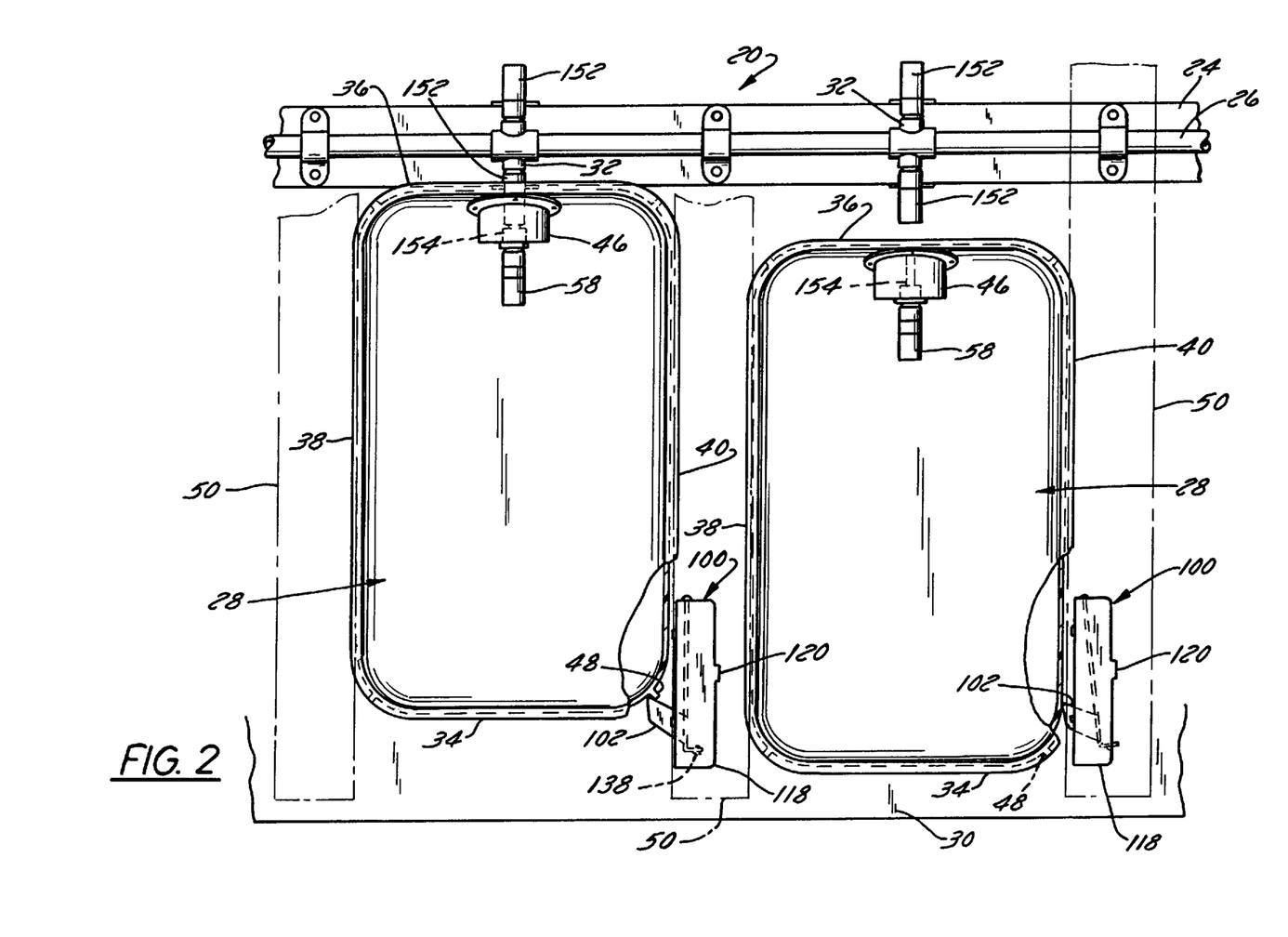
FIG. 2 is a top plan view of a portion of the cage and rack system of FIG. 1.

FIG. 1 illustrates a typical configuration of cages 28 on the rack 22. Three cages 28 are illustrated, with the two cages shown on the left side of the drawing being in a docked position and the cage in the upper right portion being shown in an undocked position. The portion of the rack 22 seen in the lower right portion of the drawing is empty and ready to receive a cage. That cage 28 is docked to the air manifold 24 and water manifold 26 simply by setting the rear or inner end 36 of the cage 28 on the front or outer end of the shelf 30 and sliding it back along the shelf 30 in the direction of arrow 72 in FIG. 3. The pivot arm 106 of the latch mechanism 100 swings in the direction of arrow 74 in FIG. 6 at this time so as permit sliding movement of the cage 28 as illustrated in FIGS. 3, 8a, and 8b. The cage 28 is guided by the channel guide assemblies 50 so that the male fitting 154 of the coupling 150 is guided towards the female fitting 152 as illustrated e.g., by the arrow 76 in FIG. 9. The cage 28 continues to slide onto the shelf 30 as the plug 186 of the male fitting 154 slides progressively further into the bore 162 in the female fitting 152 as illustrated sequentially in FIGS. 10a –10d. Although the coupling 150 is in its operative position in FIG. 10c, the rib 48 on the cage 28 does not clear the tip 135 of the latch catch 102 until just before the male fitting 154 achieves its over-travel position illustrated in FIG. 10d, at which time the latch catch 102 may pivot, under the force of spring 108, to the position illustrated on the left half of FIG. 1, the left half of FIG. 2, and in FIG. 5. (Also, compare FIG. 8b to FIG. 8c). The cage 28 is now free to rebound so that the coupling 150 is again in the position illustrated in FIG. 10c. At this time, the cage 28 is docked to the water manifold 26 and to the air supply manifold 24 and is latched in this position by the latch mechanism 100, and more particularly, by the latch catch 102 as seen most clearly in FIG. 8c.

Assuming now that one wishes to remove a cage 28 from the rack 22, e.g., for cleaning or for access to the animals housed therein, he or she grasps the sidewalls 38 and 40 of the cage 28 with both hands near the top portion thereof. The latch mechanism 100 is positioned so that, when one grasps the sidewall 40 of cage 28 with his or her right hand, his fingers will be positioned in the notch of plate 104 so as to engage and pivot the pivot arm 106, against the force of the spring 108, away from cage 28 while simultaneously sliding the cage 28 off the shelf 30. Interference between the pivot arm 106 and any adjacent cages 28 upon pivot arm swinging is prevented by the stop 120 which prohibits excessive pivotal motion of the pivot arm 106.

It will therefore be appreciated that removing the cage 28 from the rack 22 and unlatching the latch mechanism 100 can be performed in a single operation and is dramatically simplified compared to devices which require separate decoupling and removal operations.

As discussed above, the plug 186 on the male fitting 154 of the coupling 150 seals against the seal 170 before it lifts the valve core 174 off the seal 168. Accordingly, if for any reason the cage 28 is left in a partially-docked position illustrated in FIG. 10b in which the valve core 174 is lifted from the seal 168 but the male fitting 154 is not sealed onto the seal 168, leakage and consequent cage flooding are prevented by the seal 170. Moreover, once the cage 28 is fully docked as illustrated in FIG. 10c, the plug 186 is sealed to the body 156 by both seals 168 and 170. These seals provide considerable redundancy, preventing leakage should either seal fail.

If for any reason a cage 28 is not inserted all the way onto the shelf 30 and, accordingly, is not docked to the water manifold 26, the pivot arm 106 will be prevented from pivoting into its latched position via engagement of the tip 135 of the latch catch 102 with the side 40 of the cage 28. Accordingly, the colored indicator flag or button 138, which is normally hidden by the shield 122 when the latch mechanism 100 is latched, is open to view as illustrated in the upper right hand portion of FIG. 1, the right half of FIG. 2, FIG. 6 and FIGS. 8a and 8b, and provides an easily discernable visual indication that the latch mechanism 100 is unlatched and, accordingly, that the cage 28 is not docked. Providing this type of easily discernable visual indication of an undocked cage condition is important because 1) animals cannot obtain water when the cage 28 is not docked to the manifold 26 and may become dehydrated or even die and because 2) a single attendant may be responsible for hundreds or even thousands of cages and has little time to inspect each individual cage.

It can thus be seen that the inventive docking system in essence achieves the best of both worlds. It permits the use of a friction-fit coupling in the system, thereby facilitating cage removal from the rack while simultaneously inhibiting coupling leakage and consequent rack flooding often associated with friction-fit couplings. It is also relatively simple to fabricate and to install and is much easier to operate than comparative prior art docking systems.

Of course, the inventive coupling and the inventive latch mechanism could be used in other docking systems. A locking quick-connect coupling usable with the latch mechanism 100 in the inventive docking system will now be detailed.

6. Construction and Operation of Locking Quick-Connect Coupling

Figure 11A:
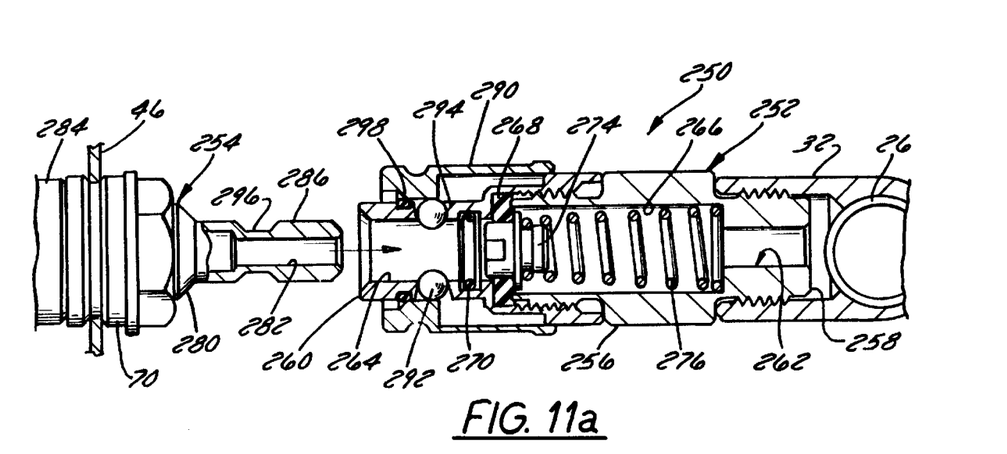
FIGS. 11a–11c are partial sectional side elevation views of a second coupling usable in the water docking system of FIGS. 1–5 and of the corresponding portions of the cage and rack system and illustrating the sequence of the coupling of the male fitting to the female fitting.
Figure 11B:
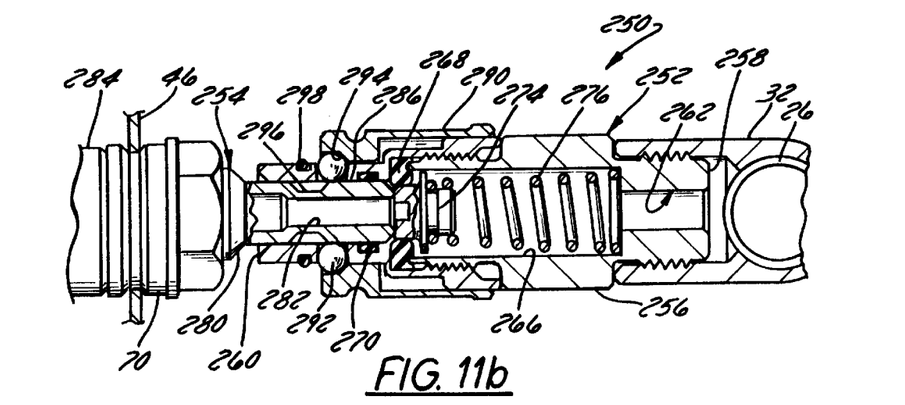
Figure 11C:
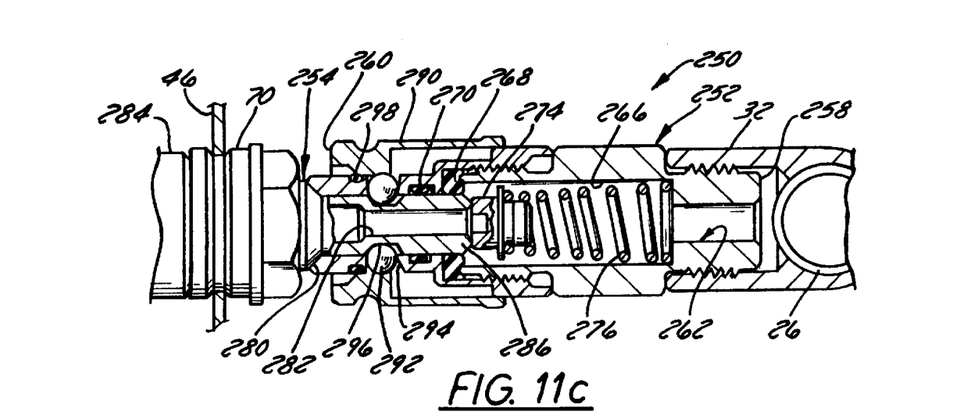

Referring now to FIGS. 11a–11c, a locking quick-connect coupling 250 usable with the water docking system described in Sections 2–5 above or in other applications is, in many respects, similar to the friction-fit coupling 150 described in Section 3 above. Elements of the coupling 250 corresponding to those of the coupling 150 are denoted by the same reference numerals, incremented by 100. The coupling 250 therefore includes a female fitting 252 and male fitting 254. The female fitting 252, like the female fitting 152 of the corresponding friction-fit coupling 150, includes a body 256 which is threadedly connectable to the nipple 32 and which has a stepped axial bore 262 formed therethrough having an outer portion 264 and an inner portion 266. Disposed in the axial bore 262 are first and second seals 268, 270, a valve core 274, and a spring 276.

The male fitting 254, like the male fitting 154 of the first embodiment, includes a body 280 having a bore 282 formed therethrough. The body 280 presents 1) an inner end 284 which is mounted on the grommet 46 by the holder 70 and which is connected to the animal watering valve 58 and 2) a plug 268. As in the first embodiment, the plug 286, the first and second seals 268 and 270, and the valve core 274 are so dimensioned and configured that, when the plug 286 is inserted axially into the bore 262 in the female fitting 252 from the outlet end thereof, the plug 286 first slidably seals against the second seal 270, then lifts the core 274 from the first seal 268, and then seals against the first seal 268.

In order to permit the coupling to function as a locking quick-connect coupling, the female fitting 252 is additionally provided with a collar 290 and a plurality of locking balls 292. The collar 290 is slidably mounted on the outer end of the body 256. The locking balls 292 are mounted in corresponding holes 294 in the body 256 and engage the outer radial periphery of the plug 286 on the male fitting 254 when the plug 286 is inserted into the bore 262. A retaining ring 298 keeps the collar 290 in place.

The collar 290 is movable 1) from a first position, illustrated in FIGS. 11a and 11c, in which it forces the locking balls 292 into corresponding recesses 296 formed in the plug 286 of the male fitting 254 so as to prevent axial movement of the male fitting 254 with respect to the female fitting 252, 2) to a second position, illustrated in FIG. 11b, in which it permits the locking balls 292 to disengage the recesses 296 in the plug 286 thereby to permit axial movement of the male fitting 254 with respect to the female fitting 252. FIG. 11c actually illustrates the plug 286 in an over-travel position corresponding to the over-travel position of plug 186 of fitting 150 illustrated in FIG. 10d. In a normal, docked state occurring after the latch mechanism 100 is latched, the balls 290 would actually be located in the center or even with the inner ends of the recesses 296 in the plug 286.

The sealing sequence of the locking quick-connect coupling 250 is the same as the sealing sequence of the friction-fit quick-connect coupling 150 described above. Coupling 250 therefore exhibits at least most of the advantages of the friction-fit coupling described above. Moreover, by locking the coupling in its coupled position, it provides redundance to the latch mechanism 100, should such redundancy be desired. Should this or other locking quick-connect couplings be employed in the docking system, a decoupler such as that disclosed in U.S. Pat. No. 5,337,696 should be employed to facilitate decoupling.

Many other changes could be made to the invention as described above without departing from the spirit thereof. The scope of these changes will become apparent from the appended claims.

I claim:

1. A cage and rack system comprising:
   (A) a rack having at least one shelf;
   (B) a water manifold mounted on said rack;
   (C) a cage supported on said shelf, said cage having a front wall and a rear wall spaced longitudinally from one another and a pair of opposed sidewalls spaced laterally from one another and connected to said front and rear walls; and
   (D) a water docking system including
      (1) a coupling, said coupling including a female fitting which is connected to said water manifold and a male fitting which is supported on said rear wall of said cage, an animal watering valve being connected to said male fitting of said coupling and extending into said cage, and
      (2) a latch mechanism which is mounted on said rack, said latch mechanism including a latch catch which is movable 1) from a latched position in which said latch mechanism positively engages said front wall of said cage and holds said cage in a position in which said male fitting is sealingly inserted into said female fitting so as to permit water to therethrough, 2) to an unlatched position in which said latch mechanism is disengaged from said cage and permits removal of said cage from said shelf, wherein at least a portion of said latch mechanism is movable in a direction which has at least one component extending longitudinally of said cage as said latch mechanism moves between said latched position and said unlatched position.

2. A cage and rack system comprising:

(A) a rack having at least one shelf;

(B) a water manifold mounted on said rack;

(C) a cage supported on said shelf, said cage having a front wall and a rear wall and a pair of opposed sidewalls connected to said front and rear walls; and (D) a water docking system including (1) a coupling, said coupling including a female fitting which is connected to said water manifold and a male fitting which is supported on said rear wall of said cage, an animal watering valve being connected to said male fitting of said coupling and extending into said cage, and (2) a latch mechanism which is mounted on said rack, said latch mechanism including a latch catch which is movable 1) from a latched position in which said latch mechanism positively engages said front wall of said cage and holds said cage in a position in which said male fitting is sealingly inserted into said female fitting so as to permit water to flow therethrough, 2) to an unlatched position in which said latch mechanism is disengaged from said cage and permits removal of said cage from said shelf, wherein said latch mechanism includes a spring which biases said latch catch into said latched position.

3. A cage and rack system as defined in claim 2, wherein said latch mechanism further includes a stationary support plate which is affixed to said rack and which extends at least generally in parallel with said sidewalls of said cage, and a pivot arm which has inner and outer ends and which has front and rear faces, wherein said inner end of said pivot arm is pivotally attached to said support plate such that said pivot arm is swingable, against the force of said spring, about a vertical axis, 1) from a first position in which said pivot arm extends at least substantially in parallel with said support plate and said outer end of said pivot arm is located adjacent said support plate 2) to a second position in which said outer end of said pivot arm is spaced transversely from said support plate, wherein said latch catch is connected to said pivot arm and extends inwardly from said front face of said outer end of said pivot arm, said latch catch being in said latched position when said pivot arm is in said first position and in said unlatched position when said pivot arm is in said second position.

4. A cage and rack system as defined in claim 3, further comprising 1) an indicator flag mounted on said pivot arm and 2) a shield provided on said support plate, said shield preventing observation of said indicator flag when said pivot arm is in said first position and permitting observation of said indicator flag when said pivot arm is in said second position.

5. A cage and rack system comprising (A) a rack having at least one shelf;

(B) a water manifold mounted on said rack;

(C) a cage supported on said shelf, said cage having a front wall and a rear wall and a pair of opposed sidewalls connected to said front and rear walls; and (D) a water docking system including (1) a coupling, said coupling including a female fitting which is connected to said water manifold and a male fitting which is supported on said rear wall of said cage, an animal watering valve being connected to said male fitting of said coupling and extending into said cage, and (2) a latch mechanism which is mounted on said rack, said latch mechanism including a latch catch which is movable 1) from a latched position in which said latch mechanism positively engages said front wall of said cage and holds said cage in a position in which said male fitting is sealingly inserted into said female fitting so as to permit water to flow therethrough, 2) to an unlatched position in which said latch mechanism is disengaged from said cage and permits removal of said cage from said shelf, wherein said female fitting of said coupling comprises 1) a generally cylindrical body having inlet and outlet ends and having a bore formed therein which extends axially from said outlet end thereof towards said inlet end thereof, 2) first and second axially-spaced seals mounted in said bore, said second seal being located axially between said first seal and said outlet end of said body, and 3) a valve core located in said bore between said first seal and said inlet end of said body, said valve core being capable of sealingly seating on said first seal, and wherein said male fitting of said coupling includes a generally cylindrical plug, said plug being dimensioned to fit in said bore in said female fitting of said coupling and having a bore formed axially therethrough, wherein said plug, said first and second seals, and said valve core are so dimensioned and configured that, when said plug is inserted axially into said bore in said female fitting from said outlet end thereof, said plug 1) first slidably seals against said second seal, 2) then lifts said valve core from said first seal, 3) then slidably seals against said first seal.

6. A cage and rack system as defined in claim 5, wherein said bore in said female fitting of said coupling is stepped so as to have an inner portion having a first diameter and an outer portion having a second diameter which is smaller than said first diameter, wherein said first seal and said valve core are located in said first portion of said bore and said second seal is located in said second portion of said bore.

7. A cage and rack system comprising:

(A) a rack having at least one shelf;

(B) a water manifold mounted on said rack;

(C) a cage supported on said shelf, said cage having a front wall and a rear wall and a pair of opposed sidewalls connected to said front and rear walls; and (D) a water docking system including (1) a coupling, said coupling including a female fitting which is connected to said water manifold and a male fitting which is supported on said rear wall of said cage, an animal watering valve being connected to said male fitting of said coupling and extending into said cage, and (2) a latch mechanism which is mounted on said rack, said latch mechanism including (a) a latch catch which is movable from 1) a latched position in which it positively engages said front wall of said cage and holds said cage in a position in which said male fitting is sealingly inserted into said female fitting so as to permit water to flow therethrough, to 2) an unlatched position in which it is disengaged from said cage and permits removal of said cage from said shelf, (b) a stationary support plate which is affixed to said rack and which extends at least generally in parallel with said sidewalls of said cage, and (c) a pivot arm which has inner and outer ends and which has front and rear faces, wherein said inner end of said pivot arm is pivotally attached to said support plate such that said pivot arm is swingable, against the force of a spring, about a vertical axis, 1) from a first position in which said pivot arm extends at least substantially in parallel with said support plate and said outer end of said pivot arm is located adjacent said support plate 2) to a second position in which said outer end of said pivot arm is spaced transversely from said support plate, wherein said latch catch is connected to said pivot arm and extends inwardly from said front face of said outer end of said pivot arm, said latch catch being in said latched position when said pivot arm is in said first position and in said unlatched position when said pivot arm is in said second position.

8. A cage and rack system comprising:

(A) a rack having at least one shelf;

(B) a water manifold mounted on said rack;

(C) a cage supported on said shelf, said cage having a front wall and a rear wall and a pair of opposed sidewalls connected to said front and rear walls; and (D) a water docking system including (1) a coupling, said coupling including a female fitting which is connected to said water manifold and a male fitting which is supported on said rear wall of said cage, an animal watering valve being connected to said male fitting of said coupling and extending into said cage, and (2) a latch mechanism which is mounted on said rack, said latch mechanism including a latch catch which is movable 1) from a latched position in which it positively engages said front wall of said cage and holds said cage in a position in which said male fitting is sealingly inserted into said female fitting so as to permit water to flow therethrough, 2) to an unlatched position in which it is disengaged from said cage and permits removal of said cage from said shelf, wherein said female fitting of said coupling comprises 1) a generally cylindrical body having inlet and outlet ends and having a bore formed therein which extends axially from said outlet end thereof towards said inlet end thereof, 2) first and second axially-spaced seals mounted in said bore, said second seal being located axially between said first seal and said outlet end of said body, and 3) a valve core located in said bore between said first seal and said inlet end of said body, said valve core being capable of sealingly seating on said first seal, and wherein said male fitting of said coupling includes a generally cylindrical plug, said plug being dimensioned to fit in said bore in said female fitting of said coupling and having a bore formed axially therethrough, wherein said plug, said first and second seals, and said valve core are so dimensioned and configured that, when said plug is inserted axially into said bore in said female fitting from said outlet end thereof, said plug 1) first slidably seals against said second seal, 2) then lifts said valve core from said first seal, 3) then slidably seals against said first seal.

* * * * *

UNITED STATES PATENT AND TRADEMARK OFFICE
CERTIFICATE OF CORRECTION

PATENT NO. : 5,823,144
DATED : October 20, 1998
INVENTOR(S) : Edstrom et al.

It is certified that error appears in the above-identified patent and that said Letters Patent is hereby corrected as shown below:

Column 3, line 3, after "exhibits" insert --one--.

Column 4, line 14, delete "For" and insert --A cage and rack system is disclosed that includes a cage, a shelf, and a water docking system for--.

Column 11, line 2, after "to" insert --flow--.

Signed and Sealed this

Twentieth Day of June, 2000

Attest:

Q. TODD DICKINSON

Attesting Officer     Director of Patents and Trademarks